(12) United States Patent
Merican et al.

(10) Patent No.: US 12,064,719 B2
(45) Date of Patent: Aug. 20, 2024

(54) DEVICE AND METHOD FOR SIMULTANEOUSLY PRODUCING SEPARATE FILTRATES FROM A SINGLE SUBSTRATE

(71) Applicant: France Membranes Technologies—FMT, Montpellier (FR)

(72) Inventors: Franck Merican, Montpellier (FR); Emmanuel Trouve, Vacquieres (FR)

(73) Assignee: FRANCE MEMBRANES TECHNOLOGIES-FMT, Montpellier (FR)

( * ) Notice: Subject to any disclaimer, the term of this patent is extended or adjusted under 35 U.S.C. 154(b) by 1037 days.

(21) Appl. No.: 16/955,701

(22) PCT Filed: Dec. 21, 2018

(86) PCT No.: PCT/EP2018/086695
§ 371 (c)(1),
(2) Date: Oct. 13, 2020

(87) PCT Pub. No.: WO2019/129730
PCT Pub. Date: Jul. 4, 2019

(65) Prior Publication Data
US 2023/0191292 A1    Jun. 22, 2023

(30) Foreign Application Priority Data

Dec. 28, 2017 (LU) .......................... 100597

(51) Int. Cl.
*B01D 33/21* (2006.01)
*B01D 33/74* (2006.01)
(Continued)

(52) U.S. Cl.
CPC ............. *B01D 33/21* (2013.01); *B01D 33/74* (2013.01); *B01D 63/084* (2013.01); *B01D 63/16* (2013.01);
(Continued)

(58) Field of Classification Search
CPC ...... B01D 33/15; B01D 33/155; B01D 33/21; B01D 33/25; B01D 33/215; B01D 33/56;
(Continued)

(56) References Cited

U.S. PATENT DOCUMENTS

| | | |
|---|---|---|
| 4,046,685 A | 9/1977 | Bray |
| 2003/0183586 A1 | 10/2003 | Blase et al. |
| 2014/0124431 A1* | 5/2014 | Love ...................... B01D 33/50 210/330 |

FOREIGN PATENT DOCUMENTS

| | | |
|---|---|---|
| EP | 2612701 A1 | 7/2013 |
| EP | 2905067 A1 | 8/2015 |

(Continued)

OTHER PUBLICATIONS

English language machine translation of JPH06327947, 5 pages, No Date.*

(Continued)

*Primary Examiner* — Pranav N Patel
(74) *Attorney, Agent, or Firm* — NIXON & VANDERHYE

(57) ABSTRACT

The present invention relates to a filtration device comprising:
at least one enclosure (1; 1A, 1B; 1A, 1B, 1C, 1D) defining a longitudinal axis, said enclosure being obstructed at each end by at least one sealing plate (2A, 2B; 2C, 2D),
at least one filtration disc (4) that is rotated and at least one spacer (10) placed between each filtration disc (4), said spacer (10) defining an inter-disc space (10A),
at least one hollow rotation shaft (3; 3A) that rotates said at least one filtration disc (4), said shaft having at least one port (33) adapted to collect filtrate (11A, 11B),
said filtration disc (4) and said spacer (10) being arranged on said at least one rotation shaft (3; 3A, 3B) inside said enclosure (1; 1A, 1B; 1A, 1B, 1C, 1D),
(Continued)

characterised in that said enclosure (1; 1A, 1B; 1A, 1B, 1C, 1D) is passed through by said at least one rotation shaft (3; 3A), and said rotation shaft (3; 3A) is driven by at least one separate rotation means (5, 5A, 5B, 5C) on at least one of the ends of said shaft, said rotation means and said rotation shaft being coaxial, and in that the device comprises at least two separate discharge means (13A, 13B) for the filtrate (11A, 11B), said discharge means being located on said rotation shaft outside said enclosure.

16 Claims, 16 Drawing Sheets

(51) Int. Cl.
  B01D 63/08 (2006.01)
  B01D 63/16 (2006.01)
(52) U.S. Cl.
  CPC ...... *B01D 2315/02* (2013.01); *B01D 2317/04* (2013.01); *B01D 2319/04* (2013.01)

(58) Field of Classification Search
  CPC ...... B01D 33/74; B01D 63/08; B01D 63/084; B01D 63/16; B01D 2315/02; B01D 2317/04; B01D 2319/04; B01D 2201/282; B01D 2201/287
  See application file for complete search history.

(56) References Cited

FOREIGN PATENT DOCUMENTS

| | | |
|---|---|---|
| JP | H06327947 A | 11/1994 |
| JP | H07289861 A | 11/1995 |
| WO | 03039708 A1 | 5/2003 |
| WO | 2013000002 A1 | 1/2013 |

OTHER PUBLICATIONS

International Search Report issued in connection with PCT Application No. PCT/EP2018/086695 dated Apr. 2, 2019.

\* cited by examiner

DEVICE AND METHOD FOR SIMULTANEOUSLY PRODUCING SEPARATE FILTRATES FROM A SINGLE SUBSTRATE

CROSS-REFERENCE TO RELATED APPLICATIONS

This is a 35 U.S.C. 371 National Stage Patent Application of International Application No. PCT/EP2018/086695, filed Dec. 21, 2018, which claims priority to Luxembourg application 100597, filed Dec. 28, 2017, each of which is hereby incorporated by reference in its entirety.

BACKGROUND OF THE INVENTION

The present invention relates to a device and a method for co-extracting separate filtered liquids, with high-efficiency rotary discs for energy and for transfers.

The extraction of filtered liquids is carried out by liquid/solid separation and by molecular sieving using membranes: these filters with submicron size pores are implanted in modules (casings or enclosures) that provide the filtration surface and generate the hydrodynamic conditions during operation.

The present invention relates to all fields of application of industrial membrane technologies, in particular the agro-food, agricultural, pharmaceutical, cosmetic, chemical, oil and gas industries and all activities related to wastewater (digestates, slurries, all kinds of effluents) and the environment (wastewater treatment plant, biogas producers, dairy effluents, building operators and managers, etc.).

More particularly, the present invention is intended for applications that are penalised by an excessively high cost of the membrane modules and/or by the succession of membrane modules required to obtain separate filtered liquids and/or by excessive energy consumption during the use of said membrane modules.

There is no system equivalent to that of the present invention.

WO 2013/000002 relates to a device for filtering liquids but does not disclose two separate coaxial rotation shafts separated axially from one another.

EP 2905067 relates to a dynamic filtration device for a liquid but does not disclose two separate coaxial rotation shafts separated axially from one another.

JP H07 289861 relates to a device for rotating and agitating liquids, but does not disclose two coaxial motors, nor discharge of the filtrate (11A, 11B) by a first discharge means (13A) and by a second discharge means (13B) located on said rotation shaft outside said enclosure. This device comprises a mixer part (on the left) and a filtration part (on the right) with a filtrate exiting via an outlet (40).

US 2003/0183586 relates to a device for mixing and agitating a liquid and a flocculant, but does not disclose a rotation shaft driven by at least one separate rotation means at each end of said shaft, said rotation means and said rotation shaft being coaxial.

EP 2612701 relates to a device for filtering liquids.

The same membrane, used on the same fluid, can give different performances in different modules, even under apparently identical operating conditions. This is due to the geometric configuration of the module. The present invention relates more particularly to the "disc" geometry, wherein a module generally of cylindrical shape comprises one or more series of membrane discs.

This type of module is equipped with an external motor driving a shaft to rotate the membrane discs and to ensure the discharge of the materials retained during filtration.

The resistance of the mechanical parts of the axis of rotation is limited on the one hand by the need to have a hollow part having the largest possible diameter to allow discharge of the filtered liquid, and on the other hand by the outer diameter, which must be as small as possible so as not to reduce the filtration area of the hollow filtration discs in relation to their diameter. Said mechanical resistance of said axis of rotation determines a maximum limit of torque and/or of the speed of rotation of the discs, which limits or even renders economically obsolete the implementation of this type of module in certain industrial applications.

Even at moderate speed, the resistance of the mechanical parts of the axis of rotation also determines a limited maximum number of discs per casing (or enclosure), which prohibits the use of this type of module in certain industrial applications.

A first problem to be solved by the present invention consists in simultaneously extracting at least two separate filtered liquids from the same module. A second problem to be solved by the present invention consists in increasing the capacity of rotation of the discs of the same casing (or enclosure), at a constant specific power consumption, and in reducing the formation of bottlenecks in the capacity for evacuating the filtered liquids.

The solution to these problems is to multiply the number of drive means for the discs of the same casing (or enclosure) and to decouple the groups of membrane discs, so that each of the disc groups is specifically driven by one of said dedicated transmission means and the filtrate discharges obtained can be separated.

The present invention consists in decoupling and separating the discharges of the filtrates obtained by filtration through each of the groups of membrane discs by means of a shutter in the hollow rotation shaft and/or by means of an implementation of separate rotation shafts in the same enclosure and/or by means of the implementation of membrane discs with separate cut-off thresholds in the same enclosure. The method described in the present invention consists in providing at least one second means of transmission at the other end of the casing (or enclosure) and in dissociating the membrane discs into at least two sub-assemblies, carried by at least one rotation shaft, so that each disc group is specifically driven by one of said dedicated transmission means.

The advantages obtained are:
It is no longer necessary to use several successive enclosures to obtain several filtrates of distinct compositions (saving in investment costs by simplification).
It is no longer necessary to wait until obtaining a first filtrate before applying a second filtration (saving time by simultaneity).
It is possible to simultaneously obtain at least two separate filtered liquids from the same initial substrate (gain in recovery of a raw material by fractionation).

The present invention relates to a filtration device comprising:
at least one enclosure (1; 1A, 1B; 1A, 1B, 1C, 1D) defining a longitudinal axis, said enclosure being obstructed at each end by at least one sealing plate (2A, 2B; 2C, 2D),
at least one filtration disc (4) that is rotated and at least one spacer (10) placed between each filtration disc (4), said spacer (10) defining an inter-disc space (10A), at least one hollow rotation shaft (3; 3A) that rotates said at least one filtration disc (4), said shaft having at least one port (33) adapted to collect filtrate (11A, 11B), said filtration disc (4) and said spacer (10) being arranged on said at least one rotation shaft (3; 3A, 3B) inside said enclosure (1; 1A, 1B; 1A, 1B, 1C, 1D), characterised in that said enclosure (1; 1A, 1B; 1A, 1B, 1C, 1D) is passed through by said at least one rotation shaft (3; 3A), and said rotation shaft (3; 3A) is driven by at least one separate rotation means (5, 5A, 5B, 5C) on at least one of the ends of said shaft, said rotation means and said rotation shaft being coaxial, and in that the device comprises at least two separate discharge means (13A, 13B) for the filtrate (11A, 11B), said discharge means being located on said rotation shaft outside said enclosure.

Preferably, at least one port (33) allows flow from the spacer (10) to the interior of the shaft.

Preferably, if only one rotation shaft (3; 3A) is present inside said enclosure, a shutter (15) is placed inside said rotation shaft, separating said rotation shaft into two separate parts (30A, 30B), each separate part evacuating a different filtrate (11A, 11B) in opposite directions, said shutter being adapted to prevent the different filtrates from mixing.

Preferably, each separate part (30A, 30B) of said rotation shaft has at least one of said port (33) adapted to conduct filtrate (11A, 11B) from the spacer (10) towards the interior of said rotation shaft.

Preferably, the two separate parts (30A, 30B) are each delimited on the one hand by a discharge means (13A, 13B) for the filtrate (11A, 11B) and on the other hand by the shutter (15).

Preferably, the two separate parts (30A, 30B) are each of the same or different dimension (length, section, diameter) depending on the location of the shutter (15) inside the rotation shaft.

Preferably, if only one rotation shaft (3; 3A) is present inside said enclosure, the recovery of the filtrate (11A, 11B) is carried out in two separate parts (30A, 30B) of said rotation shaft, each separate part evacuating a different filtrate (11A, 11B) in opposite directions, the two separate parts (30A, 30B) each being delimited on the one hand by a means for discharge (13A, 13B) of the filtrate (11A, 11B) and on the other hand by the middle of the enclosure.

Preferably, if two rotation shafts (3; 3A) are present inside said enclosure, collection of the filtrate (11A, 11B) is carried out in two separate parts (16A, 16B) within said enclosure, each separate part evacuating a different filtrate (11A, 11B) in opposite directions, and the two separate parts (16A, 16B) are each delimited on the one hand by a means for discharge (13A, 13B) of the filtrate (11A, 11B) and on the other hand by the distal end of each rotation shaft inside the enclosure.

Preferably, said enclosure (1; 1A, 1B; 1A, 1B, 1C, 1D) is passed through by at least two separate rotation shafts (3; 3A, 3B) arranged successively, delimiting two separate successive filtration sections in the enclosure, each section being delimited by the sealing plate and the end of the rotation shaft internal to the enclosure, and each of said rotation shafts (3; 3A, 3B) is driven by at least one separate rotation means (5,5A, 5B, 5C), said rotation means are coaxial and said rotation shafts are separated axially from each other, and the device comprises at least one discharge means (13A, 13B) for the filtrate (11) per rotation shaft, each discharge means being located on said rotation shaft outside said enclosure.

The term "successively" has the following meaning: a series of means following each other in a line, in single file. The term "successively" has a broader scope than the term "coaxially" because it includes deviations in direction.

Preferably, said at least one separate rotation means (5, 5A, 5B, 5C) is situated outside said enclosure and at the end of each of said shafts.

Preferably, said discharge means are located on said rotation shaft either between said sealing plate and the proximal end of said rotation means, or at the distal end of said rotation means.

The proximal end of the rotation means is defined by the end of the rotation means closest to the enclosure. The distal end of the rotation means is defined by the end of the rotation means furthest from the enclosure.

Preferably, the number of rotation shafts (3; 3A, 3B) is greater than or equal to 1, 2, 3, 4, 5, 6, 7, 8, 9, 10, 20, 30, 40, 50, 60, 70, 80, 90, 100 or more, regardless of the number of enclosures present in the device. Preferably, the number of rotation shafts (3; 3A, 3B) is greater than or equal to 1, 2, 3, 4, 5, 6, 7, 8, 9, 10, 20, 30, 40, 50, 60, 70, 80, 90, 100 or more, regardless of the number of rotation means (5) present in the device. Preferably, the number of rotation means (5; 5A, 5B, 5C) is greater than or equal to 1, 2, 3, 4, 5, 6, 7, 8, 9, 10, 20, 30, 40, 50, 60, 70, 80, 90, 100 or more, regardless of the number of enclosures (1; 1A, 1B; 1C, 1D) present in the device. Preferably, the number of rotation means (5) is greater than or equal to 1, 2, 3, 4, 5, 6, 7, 8, 9, 10, 20, 30, 40, 50, 60, 70, 80, 90, 100 or more, regardless of the number of rotation shafts (3; 3A, 3B) present in the device. Preferably, the rotation shaft (3; 3A, 3B) is substantially horizontal. Preferably, the rotation shaft (3; 3A, 3B) rotates either clockwise, or anti-clockwise, within the same enclosure. Preferably, each rotation shaft (3; 3A, 3B) rotates either in the same direction of rotation, or in an opposite direction of rotation of a shaft relative to the other shaft, within the same enclosure.

Preferably, the space between said enclosure (1) and the filtration disc (4) is between 10 mm and 400 mm, 20 mm and 300 mm, 30 mm and 200 mm, 40 mm and 100 mm, 50 mm and 90 mm.

Preferably, the rotation shaft (3; 3A, 3B) is hollow. Preferably, said enclosure (1; 1A, 1B; 1C, 1D) remains stationary. Preferably, said enclosure (1; 1A, 1B; 1C, 1D) is passed through longitudinally by at least one rotation shaft. Preferably, said sealing plate (2A, 2B) is passed through at its centre by at least one rotation shaft. Preferably, an internal part (30A, 30B) of said rotation shaft (3) is used to collect and evacuate the permeate (also called the filtrate) from said filtration disc (4) outside said enclosure. Preferably, at least one introduction means (6) for the liquid to be filtered passes through at least one sealing plate (2A, 2B). Preferably, at least one outlet means (7) for the concentrate to exit said enclosure (1) passes through at least one sealing plate. Preferably, the length of said inter-disc space (10A) is either identical or increasing, between the introduction means (6) and the outlet means (7). Preferably, the length of the inter-disc space (10A) varies between 4 mm and 10 mm, 5 mm and 9 mm, 6 mm and 8 mm. Preferably, at least two rotation shafts (3) are provided in the same enclosure (1). Preferably, the rotation shafts (3) located in the same enclosure rotate in opposite directions with respect to each other.

Preferably, the introduction means (6) for the product to be filtered (8) are connected to said sealing plates (2) and the outlet for the concentrate is connected at a point located between the inner ends of the shafts located in the enclosure.

Preferably, the introduction means (6) for the product to be filtered (8) is connected to one of the sealing plates (2A) and the outlet means (7) for the concentrate is connected to the opposite sealing plate (2B). Preferably, the filtration discs (4) have cut-off thresholds for microfiltration or ultrafiltration or nanofiltration. Preferably, the filtration discs (4) associated with a shaft can be grouped into several subassemblies composed individually of 5 to 80 discs. Preferably, the filtration discs (4) are made of ceramic or metal or of carbides or organic materials or a mixture of at least two of said aforementioned materials.

One embodiment may include at least two enclosures (1A, 1B; 1C, 1D) arranged either horizontally and parallel to one another or either vertically and parallel to one another. Preferably, said rotation shaft (3; 3A, 3B) rotates at least two separate groups of filtration discs (4), which allows a reduction of the number of rotation shafts (3; 3A, 3B) driving said filtration disc groups (4) in the same enclosure and a decoupling between the filtration disc groups (4), so that each of the filtration disc groups (4) is specifically driven by at least one dedicated rotation shaft (3; 3A, 3B), allowing the discharge of the filtrate (11A, 11B) obtained by a discharge means (13A, 13B) for the filtrate (11A, 11B). Preferably, said discharge means (13A, 13B) for the filtrate (11A, 11B) is placed on a shaft (3; 3A, 3B) and is located outside said enclosure (1; 1A, 1B; 1A, 1B, 1C, 1D) delimited by each sealing plate (2A, 2B; 2C, 2D) located at the end of the enclosure.

Preferably, the device comprises at least two separate means (13A, 13B) for evacuating the filtrate (11A, 11B), collecting in 2 zones (14A, 14B) with distinct hydrodynamic conditions within said enclosure, which separate filtrates (11A, 11B) are evacuated from the same substrate simultaneously, said discharge means being located on said rotation shaft outside said enclosure.

In the case where there is only one rotation shaft, the zone (14 A) is located between the internal part of the enclosure of the sealing plate (2A) on the side at which the liquid to be filtered (6) is introduced and the middle of the enclosure. The zone (14B) is located between the internal part of the enclosure of the sealing plate (2B) on the outlet side of the liquid to be filtered and the middle of the enclosure.

In the case where there is only one shaft and in the presence of the shutter (15), the zone (14A) is located between the internal part of the enclosure of the sealing plate (2A) on the side at which liquid is introduced into filter (6) and the perpendicular of the shutter (15). The zone (14B) is located between the internal part of the enclosure of the sealing plate (2B) on the outlet side of the liquid to be filtered and the perpendicular of the shutter (15).

Preferably, the zone (14A) can be of a dimension smaller than, greater than or equal to the zone (14B).

In the case where there is only one shaft and in the absence of the shutter (15), the zone (14A) is located between the internal part of the enclosure of the sealing plate (2A) on the side of introduction of the liquid to be filtered (6) and the middle of the enclosure. The zone (14B) is located between the internal part of the enclosure of the sealing plate (2B) on the outlet side of the liquid to be filtered and the middle of the enclosure.

Preferably, said filtration discs (4) are divided into a plurality of groups, the cut-off thresholds of which are chosen independently of one another to allow the obtainment of filtrates (11A, 11B) obtained with different cut-off thresholds.

The present invention also relates to a filtration method implemented by the device of the present invention, characterised in that it comprises the following steps:
   introducing the liquid to be filtered (8) by at least one introduction means (6; 6A, 6B) at a sealing plate (2; 2A, 2B),
   rotating at least one rotation shaft (3; 3A, 3B) by at least one rotation means (5A, 5B, 5C) separate from at least one of the ends of said rotation shaft,
   filtering said liquid to be filtered (8) by passing it through at least one filtration disc (4),
   obtaining a concentrate (12) inside the enclosure (1; 1A, 1B; 1A, 1B, 1C, 1D),
   evacuating said concentrate (12) from said enclosure (1; 1A, 1B; 1A, 1B, 1C, 1D) by the outlet means (7) for said concentrate (12),
   obtaining a filtrate (11A, 11B) collected by at least one port (33) located on said at least one rotation shaft (3; 3A, 3B) that is axial relative to said enclosure (1; 1A, 1B; 1A, 1B, 1C, 1D),
   evacuating the filtrate (11A) by a first discharge means (13A) and the filtrate (11B) by a second discharge means (13B), said means being located on said rotation shaft outside said enclosure.

Preferably, the method comprises the following steps:
   introducing the liquid to be filtered (8) by at least one introduction means (6; 6A, 6B) at a sealing plate (2; 2A, 2B),
   rotating at least two rotation shafts (3; 3A, 3B) arranged successively in said enclosure and separated from each other, each rotation shaft being driven by at least one separate rotation means (5A, 5B, 5C), said rotation means being coaxial,
   filtering said liquid to be filtered (8) by passing it through at least one filtration disc (4),
   obtaining a concentrate (12) inside the enclosure (1; 1A, 1B; 1A, 1B, 1C, 1D),
   evacuating said concentrate (12) from said enclosure (1; 1A, 1B; 1A, 1B, 1C, 1D) by the outlet means (7) for said concentrate (12),
   obtaining a filtrate (11A, 11B) collected by at least one port (33) located on at least one rotation shaft (3; 3A, 3B) that is axial relative to said enclosure (1; 1A, 1B; 1A, 1B, 1C, 1D),
   evacuating the filtrate (11A) by a first discharge means (13A) and the filtrate (11B) by a second discharge means (13B), said means being located on said rotation shaft outside said enclosure.

BRIEF DESCRIPTION OF THE DRAWINGS

First Embodiment (FIG. 1): 2 Motors and 2 Axial Rotation Shafts within a Single Enclosure.

The first embodiment covers a filtration device comprising:
   at least one enclosure (1) defining a longitudinal axis, said enclosure being obstructed at each end by at least one sealing plate (2A, 2B), said sealing plates being passed through by an independent rotation shaft (3A, 3B) that is axial relative to said enclosure (1), and driven by at least one rotation means (5A, 5B) per rotation shaft (3A, 3B),
   at least one filtration disc (4) that is rotated and at least one spacer (10) placed between each filtration disc (4), said spacer (10) defining an inter-disc space (10A) where a seal (99) is placed, said filtration disc (4) and said spacer (10) being arranged on said at least one rotation shaft (3A, 3B) inside said enclosure (1), said rotation shaft (3A, 3B) rotating said at least one filtration disc (4) by means of at least one spacer (10) either in the same direction of rotation or in an opposite direction of rotation with respect to the opposite shaft.

Figure 1:
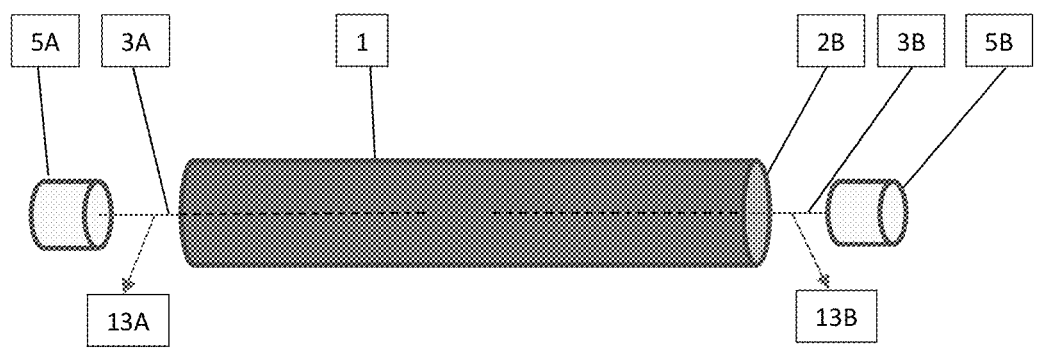

Second Embodiment (FIG. 2): 2 Motors and 1 Axial Rotation Shaft

The second embodiment covers a filtration device comprising:

at least one enclosure (1) defining a longitudinal axis, said enclosure being obstructed at each end by at least one sealing plate (2A, 2B), said enclosure (1) being passed through by a single rotation shaft (3) that is axial relative to said enclosure (1), and said rotation shaft (3) is driven by at least one rotation means (5A, 5B) at each end of said rotation shaft, at least one filtration disc (4) that is rotated and at least one spacer (10) placed between each filtration disc (4), said spacer (10) defining an inter-disc space (10A) where a seal (99) is placed, said filtration disc (4) and said spacer (10) being arranged on said at least one rotation shaft (3) inside said enclosure (1), said rotation shaft (3) rotating said at least one filtration disc (4).

Third Aspect of Disclosure (FIG. 3): 1 Motor and 2 Parallel Rotation Shafts

The third embodiment covers a filtration device comprising:

at least two substantially parallel horizontal enclosures (1A, 1B), each defining a longitudinal axis, said enclosures being obstructed at each end by at least one sealing plate (2A, 2B, 2C, 2D), said enclosures (1A, 1B) each being passed through by at least one independent rotation shaft (3A, 3B) which is axial relative to said enclosures (1A, 1B), and driven by a single means of rotation (5) of said rotation shaft (3A, 3B), at least one filtration disc (4) that is rotated and at least one spacer (10) placed between each filtration disc (4), said spacer (10) defining an inter-disc space (10A) where a seal (99) is placed, said filtration disc (4) and said spacer (10) being arranged on said at least one rotation shaft (3A, 3B) inside said enclosures (1A, 1B), said rotation shaft (3A, 3B) rotating said at least one filtration disc (4).

Fourth Aspect of Disclosure (FIG. 4): 1 Motor and 2 Parallel Rotation Shafts The fourth embodiment covers a filtration device comprising:

a longitudinal axis, at least two horizontal enclosures that are obstructed at each end by at least one sealing plate (2A, 2B, 2C, 2D), said enclosures (1A, 1B) each being passed through by at least two independent rotation shafts (3A, 3B, 3C, 3D) which are axial relative to said enclosures (1A, 1B), and driven by a single rotation means (5) of said rotation shaft (3A, 3B, 3C, 3D), at least one filtration disc (4) that is rotated and at least one spacer (10) placed between each filtration disc (4), said spacer (10) defining an inter-disc space (10A) where a seal (99) is placed, said filtration disc (4) and said spacer (10) being arranged on said at least one rotation shaft (3A, 3B, 3C, 3D) inside said enclosures (1A, 1B), said rotation shaft (3A, 3B, 3C, 3D) rotating said at least one filtration disc (4), either in the same direction of rotation, or in an opposite direction of rotation within the same enclosure (1A, 1B).

Fifth Embodiment (FIG. 5): 3 Motors and 1, 2, 3 or 4 Axial Rotation Shafts

The fifth embodiment covers a filtration device comprising:

at least two enclosures (1A, 1B) defining a longitudinal axis, said enclosures being obstructed at each end by at least one sealing plate (2A, 2B, 2C, 2D), said axial enclosures (1A, 1B) being passed through by one, two, three or four independent rotation shafts (3A, 3B, 3C, 3D) which are axial with respect to said enclosures (1A, 1B), and said rotation shafts (3A, 3B, 3C, 3D) are driven by at least one independent rotation means (5A, 5B, 5C) located at each end, outside the enclosure, of the rotation shaft, at least one filtration disc (4) that is rotated and at least one spacer (10) placed between each filtration disc (4), said spacer (10) defining an inter-disc space (10A) where a seal (99) is placed, said filtration disc (4) and said spacer (10) being arranged on said one, two, three or four rotation shafts (3A, 3B, 3C, 3D) inside said enclosures (1A, 1B, 1C, 1D), said one, two, three or four rotation shafts (3A, 3B, 3C, 3D) rotating said at least one filtration disc (4), either in the same direction of rotation, or in an opposite direction of rotation within the same enclosure (1A, 1B).

DETAILED DESCRIPTION OF THE DRAWINGS

FIG. 1 shows a first embodiment of the device of the present invention comprising 2 rotation shafts and 2 rotation means (motors) and 1 enclosure. The enclosure is formed of an enclosure closed on each side by an end plate passed through by a half shaft, the filtration discs being threaded on said half shaft. The liquid filtered by the discs is collected and evacuated through the centre of the shaft towards the outside of the enclosure. The two shafts can be rotated in the same direction or in opposite directions. The two shafts can have different rotational speeds. Both shafts can be fitted with the same number of discs or with a different number of discs.

Figure 2:
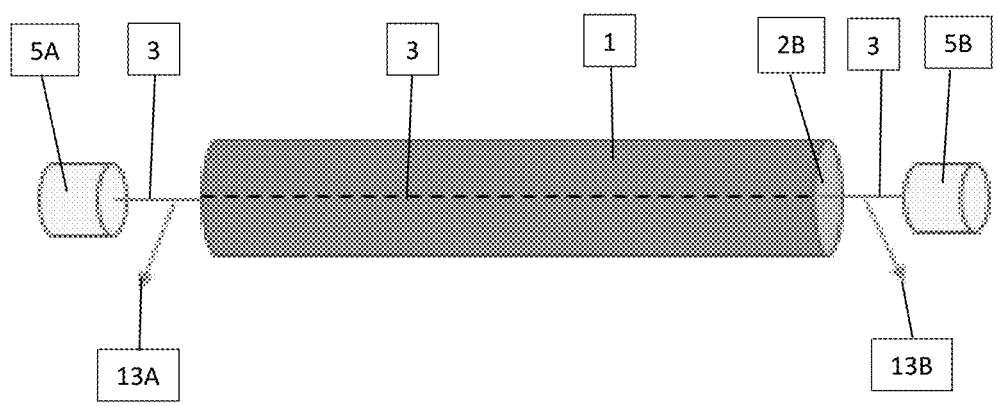

FIG. 2 shows a second embodiment of the device of the present invention comprising 1 rotation shaft and 2 rotation means (motors) and 1 enclosure. The enclosure consists of a tube closed on each side by an end plate, said plates being passed through by a single shaft, the filtration discs being threaded on said shaft. The liquid filtered by the discs is collected and evacuated through the centre of the shaft towards the outside of the enclosure at least at one of the two ends. The setting in motion of the shaft is ensured by a specific means at each end.

Figure 3:
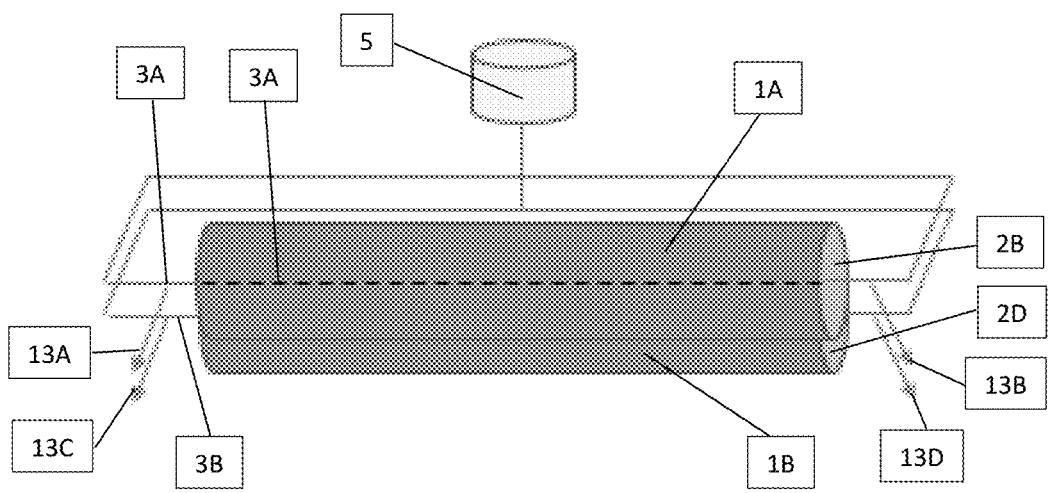

FIG. 3 shows a third embodiment of the device of the present invention comprising 2 rotation shafts substantially parallel to one another, 1 rotation means (motor) and 2 enclosures. The installation is formed of several enclosures. Each enclosure is formed of a tube closed on each side by an end plate passed through by a single shaft, the filtration discs being threaded on said shaft. The liquid filtered by the discs is collected and evacuated through the centre of the shaft towards the outside of each enclosure at least at one of the two ends. The setting in motion of the shaft of each enclosure at each end is ensured by a single means linked mechanically or hydraulically to each enclosure.

Figure 4:
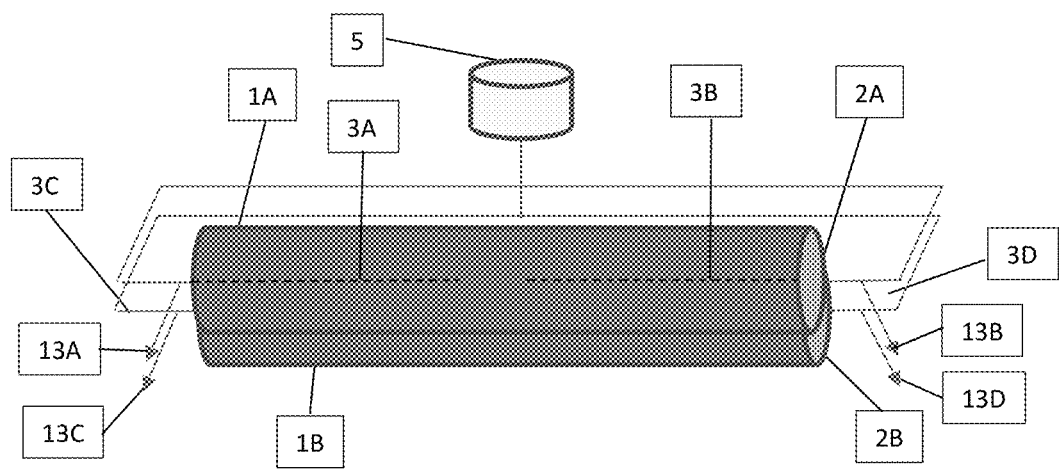
Figure 5:
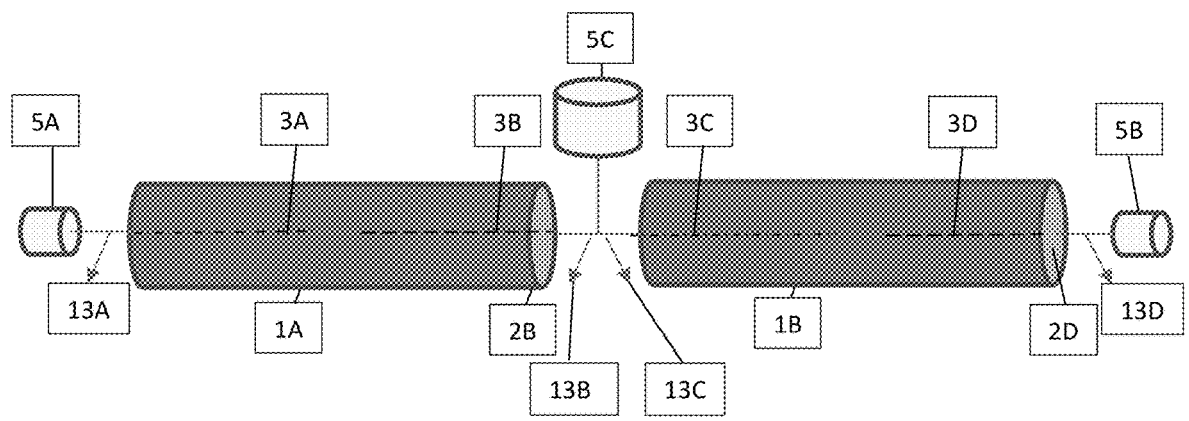

FIG. 4 shows a fourth embodiment of the device of the present invention comprising 2 independent rotation shafts that are substantially parallel to each other and 1 rotation means (motor) and 2 enclosures. This unique device for setting in motion acts at all the ends of each enclosure, possibly common to one or more enclosure(s) and several independent rotation axes. The installation consists of several enclosures (2, 3 or 4 enclosures). Each enclosure is formed of a tube closed on each side by an end plate passed through by a half shaft, the filtration discs being threaded on said half shaft. The liquid filtered by the discs is collected and evacuated through the centre of the shaft to the outside of each enclosure. The two shafts of each enclosure can be rotated in the same direction or in opposite directions. The two shafts of each enclosure can have different rotational speeds. The two shafts of each enclosure can be equipped with the same number of discs or with a different number of discs. The setting in motion of each shaft at each end of each enclosure is ensured by a single means linked mechanically or hydraulically to each enclosure FIG. 5 shows a fifth embodiment of the present invention comprising 1, 2, 3 or 4 rotation shaft(s) and 3 rotation means (motors) and 4 axial enclosures. The device can have 1, 2, 3 or 4 or more enclosures and several rotation axes and shares one or more driving devices for setting in motion two, three or four or more enclosures.

Figure 6:
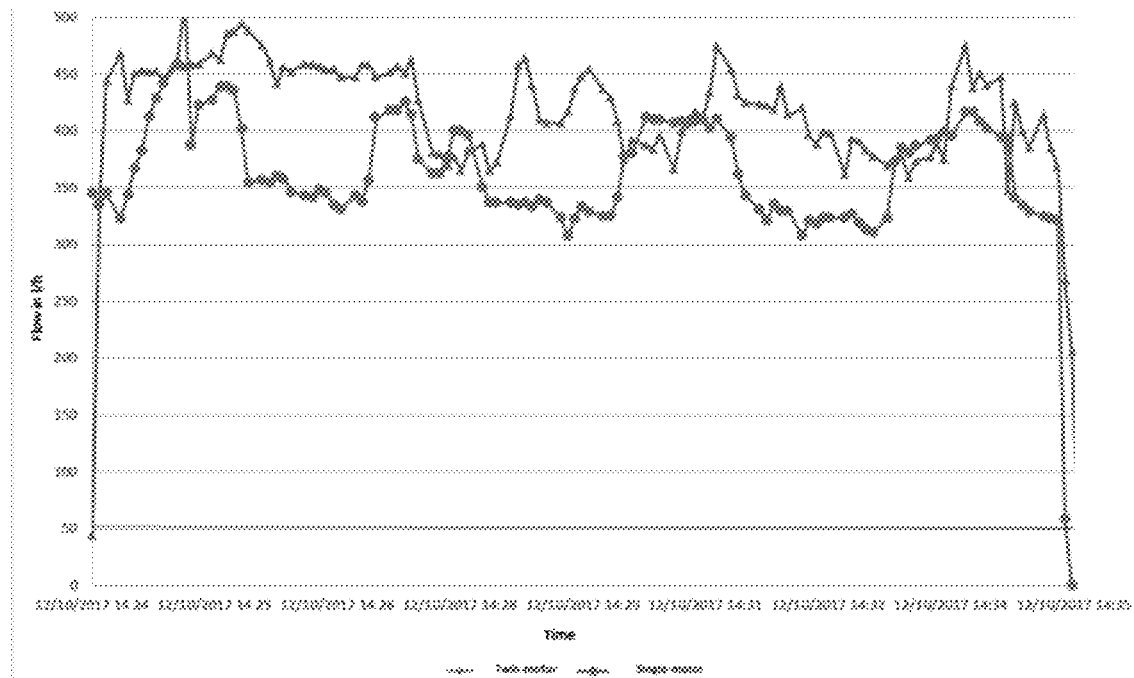

FIG. 6 shows a comparison between the single-motor device and the twin-motor device.

Figure 7:
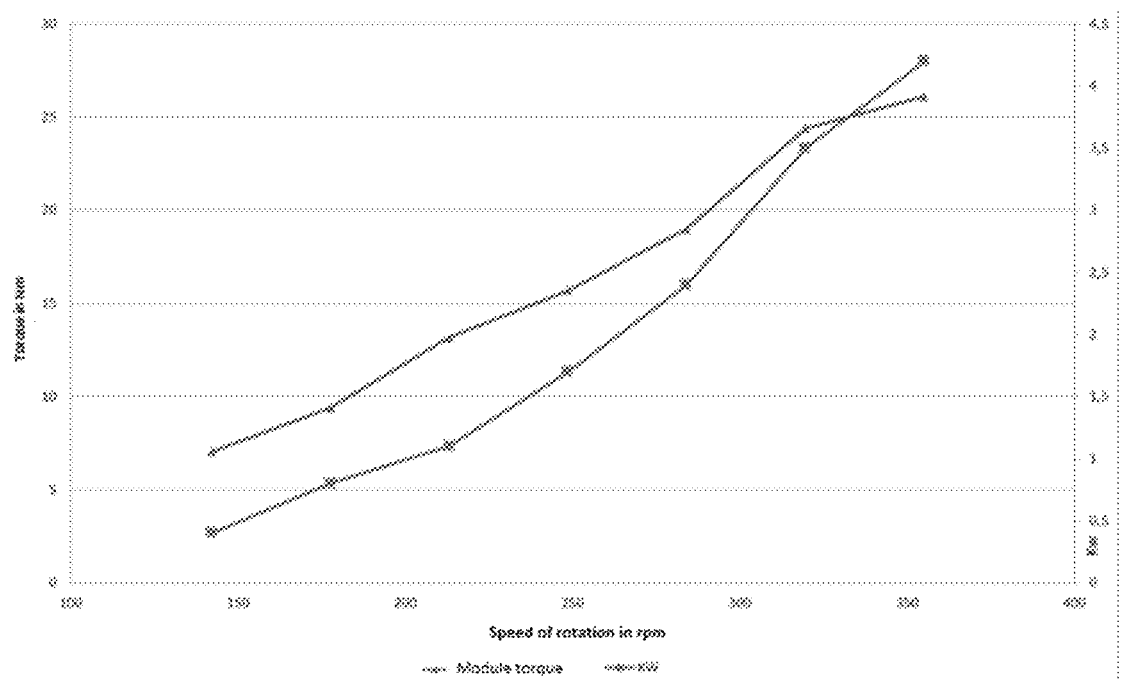

FIG. 7 shows the torque and power in comparison with the speed of rotation.

Figure 8:
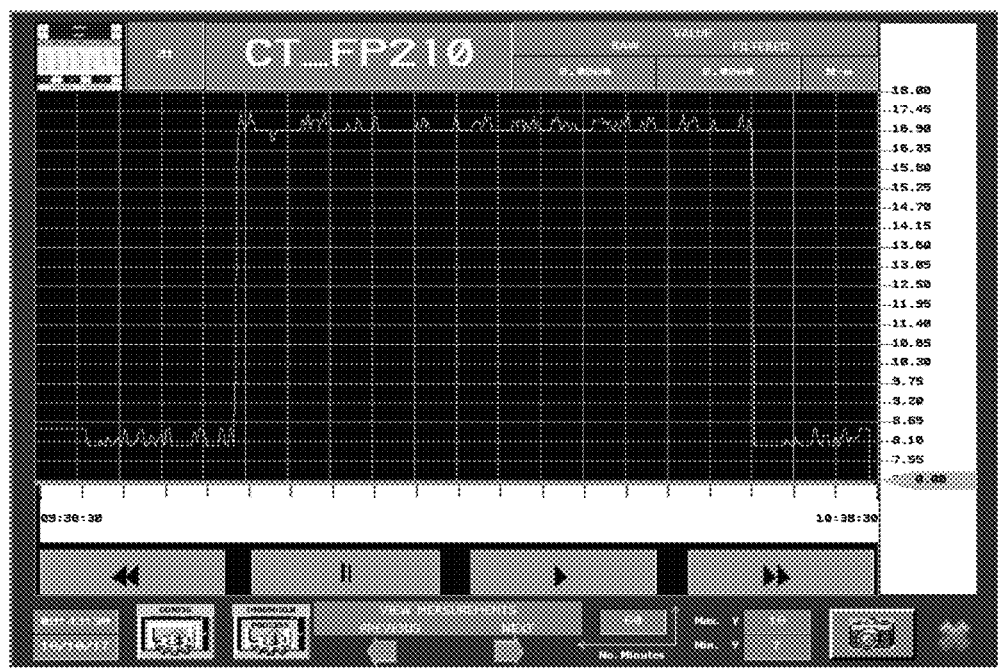

FIG. 8 shows the impact of changing the rotation speed from 284 rpm to 320 rpm on the torque in Nm.

Figure 9:
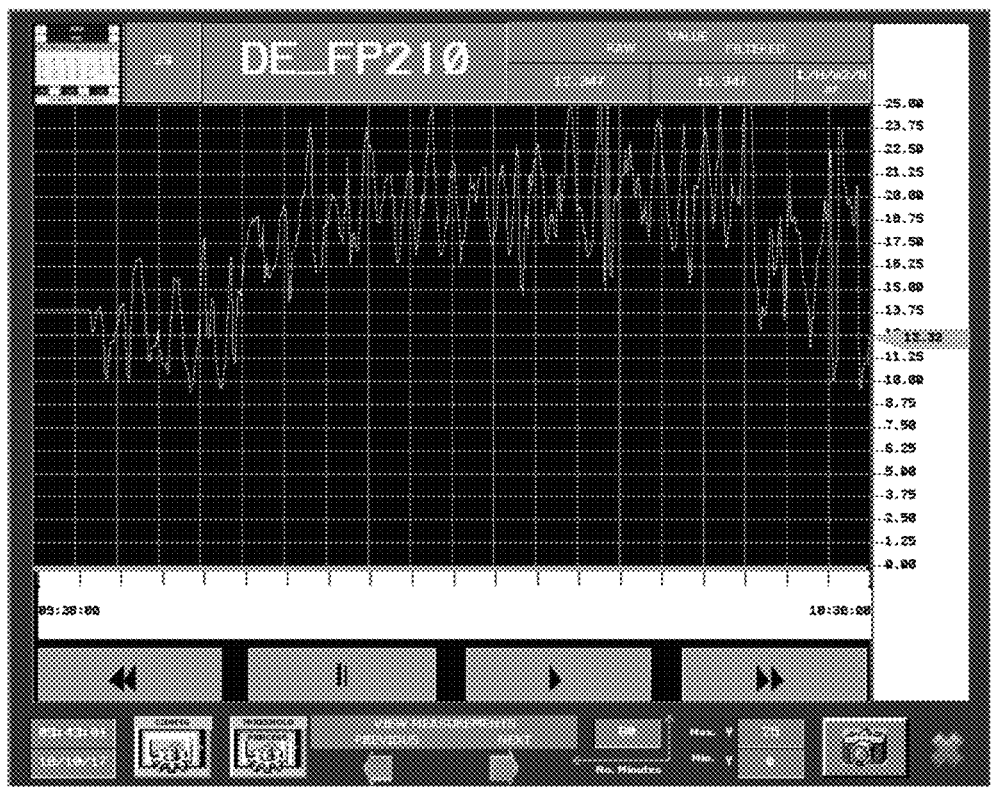

FIG. 9 shows the impact of changing the rotation speed from 284 rpm to 320 rpm on the permeation flow.

Figure 10:
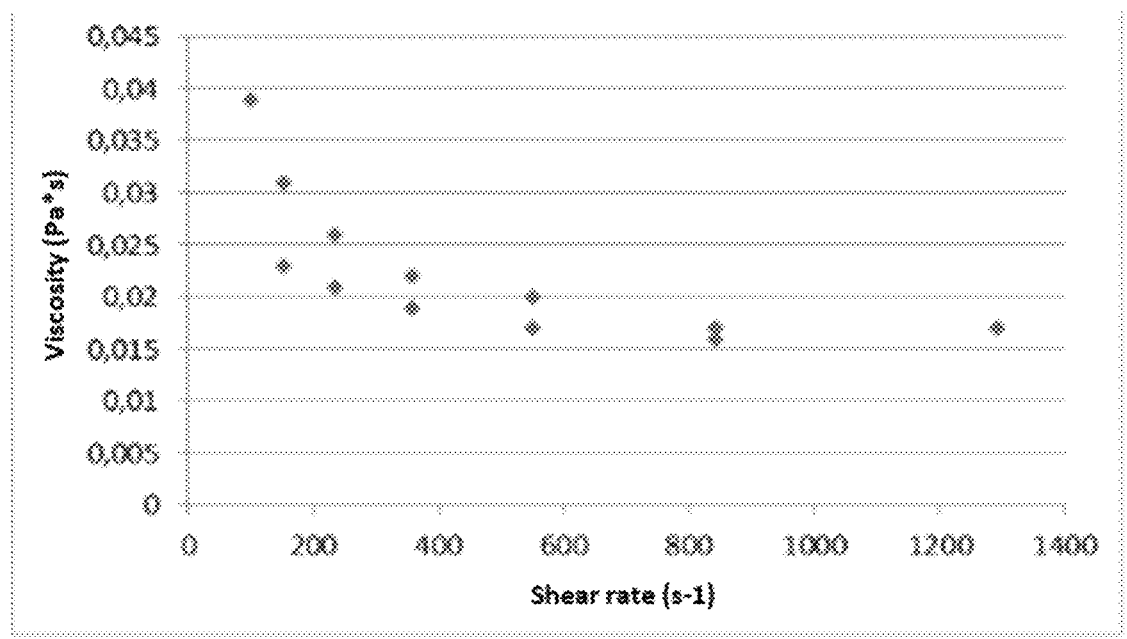

FIG. 10 shows the viscosity of the incoming product as a function of the shear rate.

Figure 11:
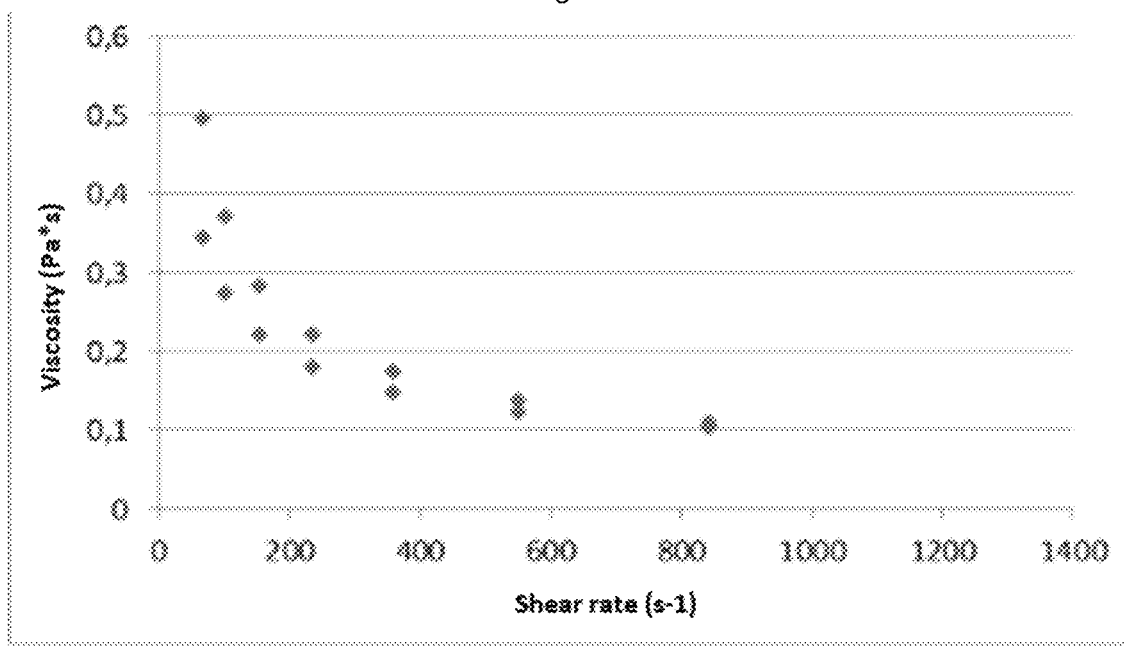

FIG. 11 shows the viscosity of the incoming product as a function of the shear rate with 10 times higher viscosity of the concentrate. The product leaving the device is much more concentrated than the product entering the device.

Figure 12:
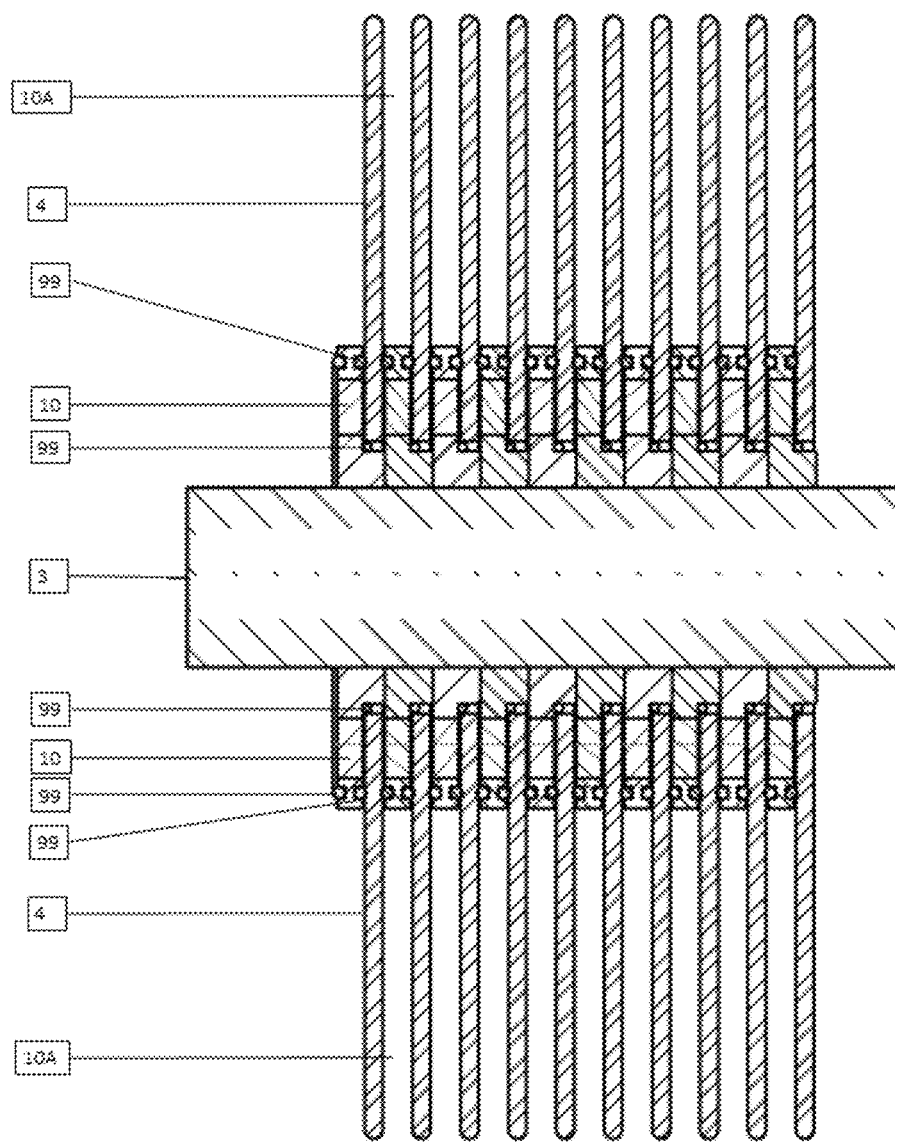

FIG. 12 shows a sectional view of the interior of an enclosure comprising at least one spacer (10), at least one seal (99), one rotation (or drive) shaft (3) and at least one filtration disc (4).

Figure 13:
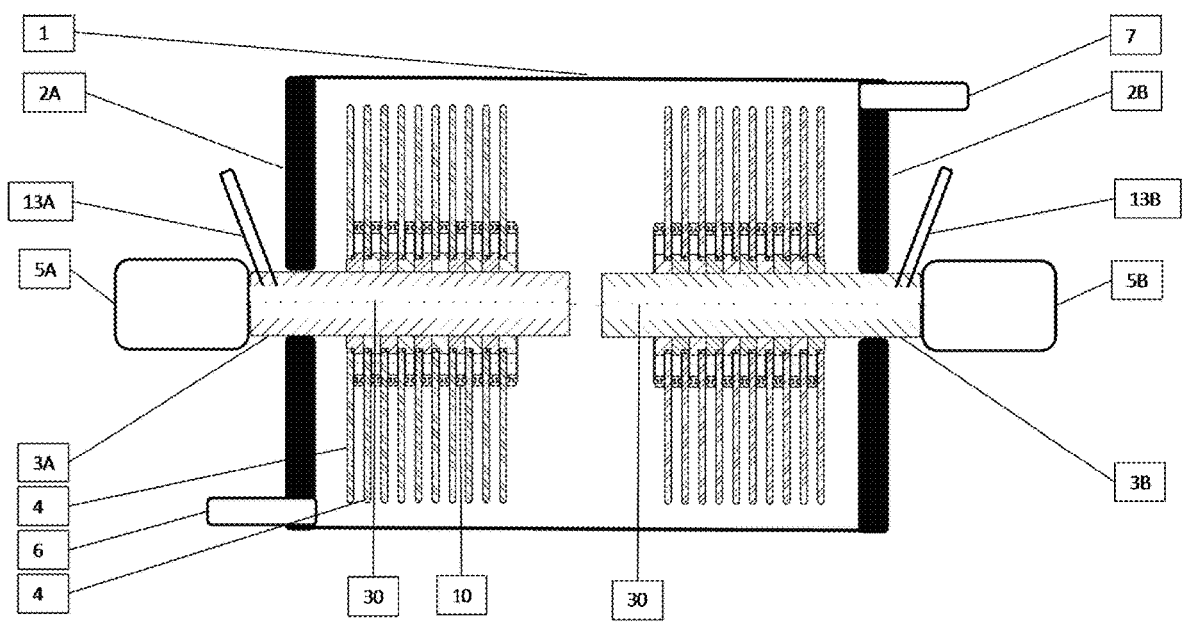

FIG. 13 shows a sectional view of the interior of an enclosure comprising two means of rotation (5A, 5B), the means of introduction (6) of the liquid to be filtered, the outlet means (7) for the concentrate (dirty liquid) by an end plate (2B) and the discharge means for the filtrate (clean liquid) (13A, 13B). The discharge means (13A) for the filtrate operates in the rotation shaft (3A) and the discharge means (13B) for the filtrate operates in the rotation shaft (3B).

Figure 14:
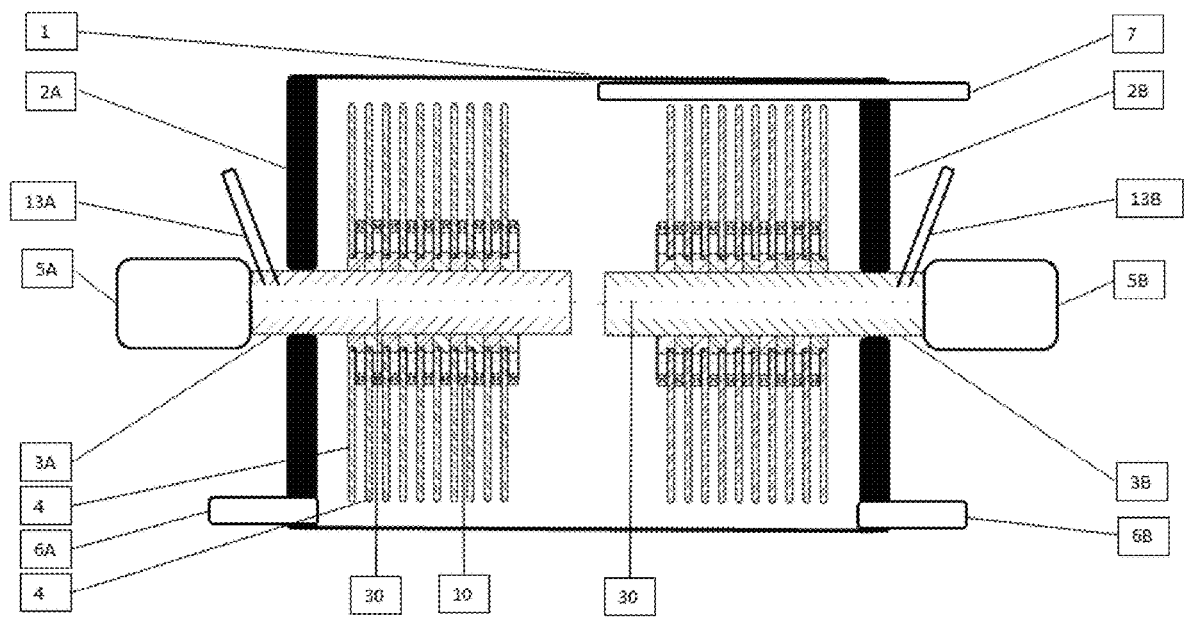

FIG. 14 shows a sectional view of the interior of an enclosure comprising two rotation means (5A, 5B), the means of introduction (6) of the liquid to be filtered, the elongate outlet means (7) for the concentrate (dirty liquid) by an end plate (2B) and the discharge means for the filtrate (clean liquid) (13A, 13B). The discharge means (13A) for the filtrate operates in the rotation shaft (3A) and the discharge means (13B) for the filtrate operates in the rotation shaft (3B).

Figure 15:
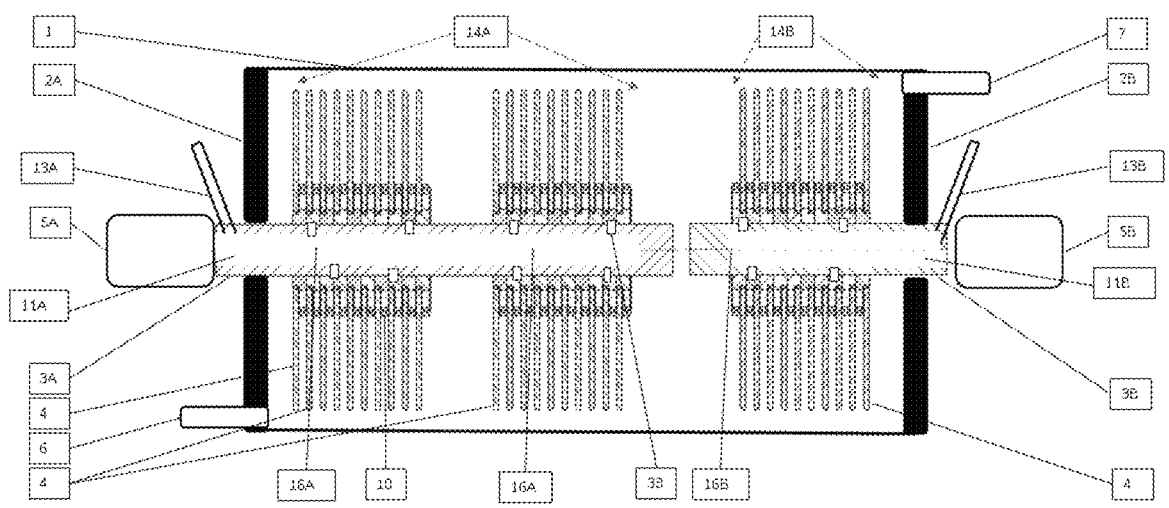

FIG. 15 shows a first rotation shaft (3A) and a second rotation shaft (3B), the two rotation shafts being coaxial and physically separated, as well as a rotation means (motor) located at the end, outside the enclosure (1), of each shaft. The discharge means (13A) for the filtrate operates in the first rotation shaft (3A) and the discharge means (13B) for the filtrate operates in the second rotation shaft (3B), said discharge means being located on said rotation shaft between said sealing plate and said rotation means. The liquid to be filtered is introduced by the introduction means (6). As they move towards the outlet means (7), the solids concentrate and increase the viscosity. The increase in viscosity leads to an increase in friction forces, which results in an increase in the torque causing the discs to rotate. The mechanical limits of the rotor, the centre of which must be hollow to allow the discharge of the filtrate, and the outside which must have the smallest possible diameter, are decoupled using the device of the present invention. In fact, the discs on the side on which the product is introduced require less torque, while those on the concentrate discharge side require more. The invention also makes it possible to rotate the discs located on separate rotation shafts at different speeds or even with opposite directions of rotation, which increases the turbulence and therefore the self-cleaning of the membranes.

FIG. 15 also shows two separate rotation shafts (3A, 3B), a motor connected to each rotation shaft, as well as two zones (14A, 14B) with distinct hydrodynamic conditions within the enclosure. A substrate is introduced by the introduction means (6), then the substrate is filtered at said filtration discs (4); the separate filtrates (11A, 11B) discharged simultaneously from the same substrate will be conducted from the spacer (10) towards the inside of each rotation shaft and are discharged in opposite directions towards one of the discharge means (13A, 13B). The solids are then moved to the solids outlet means (7).

Figure 16:
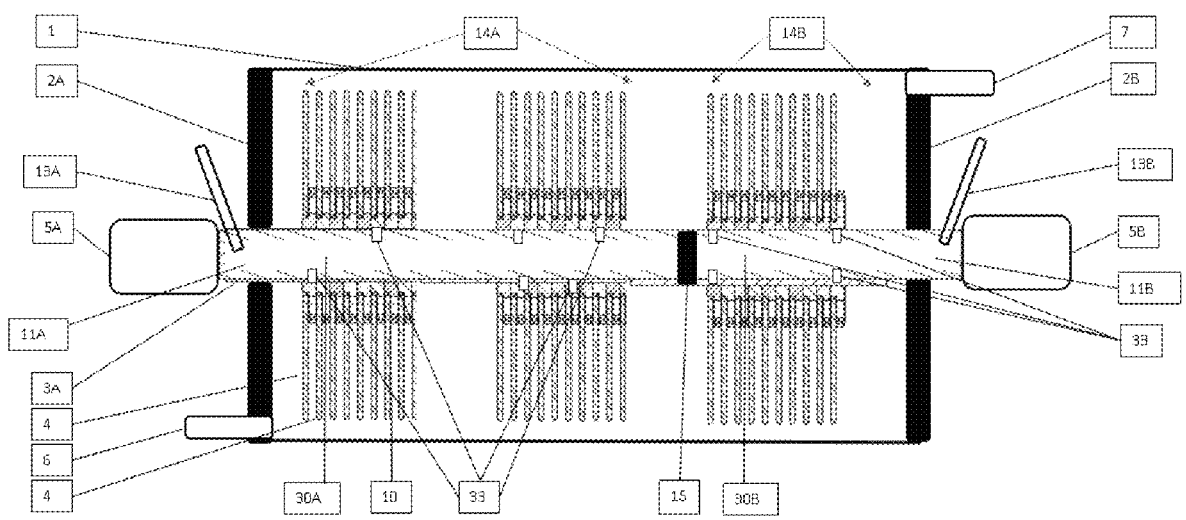

FIG. 16 shows a single rotation shaft (3A), a motor connected to each end of the rotation, shaft as well as two zones (14A, 14B) with distinct hydrodynamic conditions within the enclosure. A substrate is introduced by the introduction means (6), then said substrate is filtered at said filtration discs (4), generating separate filtrates (11A. 11B) discharged simultaneously from the same substrate and which will be conducted from the spacer (10) towards the inside of each separate part (30A, 30B) of said rotation shaft containing a shutter (15) inside. Said separate filtrates (11A, 11B) are discharged in opposite directions towards one of the discharge means (13A, 13B). The solids are then moved to the outlet means (7).

The present invention is also applicable in the case where several rotation shafts are mounted in parallel within the same enclosure. The number of axial or parallel enclosures is unlimited (at least 1, 2, 3, 4, 5, 6, 7, 8, 9, 10, 20, 30, 40, 50, 60, 70, 80, 90, 100 or more enclosures).

The advantages of the present invention is that it makes it possible:
  to increase by at least 50% the quantity of membrane discs used per casing (or enclosure) for a given speed of rotation.
  to increase by at least 50% the discharge flow of the filtrate obtained on the membrane discs with identical or lower pressure drop.

When the concentration of the product to be filtered increases, its viscosity also increases.

This results in an increase in friction on the rotating filtration discs, which requires a greater rotational force. As a result, the torque increases.

Since the power of the motor-variator (4 Kw) which drives the rotation shaft is limited, when it reaches its maximum power, and the necessary torque continues to increase, the motor decreases its rotation speed (the limit of a motor is fixed by the amperage which circulates in the coils, which can be of 8.6 A for 4 Kw). In one embodiment, an MT 430 motor has a rotation setpoint at 40 Hz (40 Hz at a rotation speed of 284 rpm) but the motor, in order not to exceed its characteristics, maintains a maximum current at 8.6 A. To do this, it is possible to decrease the rotation speed from 40 Hz to 29 Hz. This has the indirect effect of reducing the permeation flow of the installation.

TABLE 1

Comparative tests:

| | Criteria & Standards | Present invention | Current standard (single motor) |
|---|---|---|---|
| Maximum speed on horizontal enclosure of 6 m (standard) | rpm | 350 | 310 |
| Maximum allowable viscosity (at maximum enclosure speed) | | 20-50× (water) (Vmax 350 rpm) | 2-5× (water) (Vmax 210 rpm) |
| Number of horizontal enclosures enclosures for a surface of 35-50 m² (depending on space between discs) | number | 2 bottom plates (2 motors, 0 opposite plate) | 1 of 6 m |

The present invention makes it possible to increase maximum admissible viscosity by a factor of 10.

TABLE 2

| CHARACTERISTICS | units | Known single-motor enclosure | Present invention with enclosure asymmetric twin-motor | Present invention with enclosure symmetrical twin-motor |
|---|---|---|---|---|
| Main gear membrane blocks | number | 5 | 3 | 3 |
| Membrane blocks of the second gear | number | — | 2 | 2 |
| Main gear motor power | kW | 4 | 3 | 3 |
| Second gear motor power | kW | — | 2 | 3 |
| Torque at 50 Hz, 260 rpm on main gear | Nm/disc | 0.64 | 0.8 | 0.8 |
| Torque at 50 Hz, 260 rpm on second gear | Nm/disc | — | 0.8 | 1.2 |
| maximum concentration MS main gear | g/kg | 65 | 90 | 90 |
| maximum concentration MS second gear | g/kg | — | 90 | 140 |
| input raw material quantity | kg/h | 1000 | 1000 | 1000 |
| MS concentration at input | g/kg | 45 | 45 | 45 |
| retentate outlet | kg/h | 692 | 500 | 321 |
| permeate outlet | kg/h | 308 | 500 | 679 |
| Yield | kg permeate/kwh | 90 | 118 | 133 |
| Yield gain | % | I | 31 | 48 |

Table 2 shows that the present invention comprising an asymmetric twin-motor enclosure has an efficiency gain of 31% (118−90=28, if 90=100% then 28=31%).

Table 2 shows that the present invention comprising a symmetrical twin-motor enclosure has an efficiency gain of 48% (133−90=43, if 90=100% then 43=48%).

TABLE 3 comparison between the prior art and the present invention.

| Frequency (Hz) | Rotation speed of the filtering rotation shaft in rpm | Maximum torque in Nm | Motor power in Watt | Torque per disc-prior art for 3 × 36 discs in Nm | Torque per disc-present invention for 2 × 36 discs in Nm | Torque per disc-present invention for 1 × 36 discs in Nm |
|---|---|---|---|---|---|---|
| 20 | 117 | 84.5 | 1031 | 0.78 | 1.17 | 2.35 |
| 35 | 202 | 131.3 | 2780 | 1.22 | 1.82 | 3.65 |
| 50 | 289 | 131.2 | 4000 | 1.21 | 1.82 | 3.64 |
| 60 | 347 | 121 | 4400 | 1.12 | 1.68 | 3.36 |

In Table 3 (to be read with FIG. 15), the increase in viscosity leads to an increase in the friction forces which results in an increase in the torque causing the discs to rotate.

The mechanical limits of the rotation shaft, the centre of which must be hollow to allow discharge of the filtrate and the exterior of which must have the smallest possible diameter, are decoupled using the device of the present invention.

In fact, the discs on the product introduction side require less torque, while those on the discharge side of the concentrate require more.

The invention also makes it possible to rotate the discs located on separate rotation shafts at different speeds or even with opposite directions of rotation, which increases the turbulence and therefore the self-cleaning of the membranes.

The liquid to be filtered is introduced by the introduction means (6). As it moves towards the outlet means (7), the solid matter concentrates and increases the viscosity of the fluid.

In the last column of Table 3 the torque per disc of the present invention is multiplied by about 3 compared to the torque per disc of the prior art, which makes it possible to process products which are much more viscous and therefore more concentrated.

Other implementations are possible:
For example a distribution of 4 blocks/1 block between the two sets of membranes (instead of 3 & 2 as shown in Table 2)
For example with more powerful motors within the torque limit of each of the axes, for example 4 & 3 KW (asymmetrical) or 4 & 4 kW (symmetrical)
For example with other motor frequencies (40-60 Hz) and other rotational speeds (100-500 rpm).

Certain features of the invention which are described as separate embodiments can also be provided in combination in a single embodiment. In contrast, certain features of the invention which are described as an embodiment in combination in a single embodiment can also be provided separately in the form of several separate embodiments.

The invention claimed is:

1. A filtration device, comprising:
at least one enclosure defining a longitudinal axis, said at least one enclosure being obstructed at each end by at least one sealing plate;
a plurality of filtration discs that are rotated;
at least one spacer disposed between each of two of the plurality of filtration discs, said at least one spacer defining an inter-disc space;
at least one hollow rotation shaft rotating said plurality of filtration discs, said at least one rotation shaft having at least two ports configured to collect different filtrate from the at least one spacer toward an interior of the at least one hollow rotation shaft, the at least one hollow rotation shaft passing through the at least one enclosure, said plurality of filtration discs and said at least one spacer being arranged on said at least one hollow rotation shaft inside said at least one enclosure, said at least one hollow rotation shaft being driven by at least one separate rotation device on at least one end of the plurality of ends of said at least one hollow rotation shaft, said at least one separate rotation device and said respective at least one hollow rotation shaft being coaxial; and
at least two separate discharge devices configured to respectively discharge the different filtrate collected by a respective port of the at least two ports, said at least two separate discharge devices being disposed on said at least one hollow rotation shaft outside said at least one enclosure and upstream of said at least one separate rotation device.

2. The filtration device according to claim 1, wherein the at least one hollow rotation shaft is a single rotation shaft that is present inside said at least one enclosure, a shutter being disposed inside said single rotation shaft dividing said single rotation shaft into two separate parts, each of the two separate parts respectively conducting the different filtrate in opposite directions towards said discharge devices, said shutter being configured to prevent the different filtrates from mixing.

3. The filtration device according to claim 2, wherein the two separate parts are each delimited by the position of one of the discharge devices for the respective different filtrate on the single rotation shaft and a position of the shutter, and
the two separate parts are each of the same or different size depending on a position of the shutter inside the single rotation shaft.

4. The filtration device according to claim 2, wherein each of the two separate parts of said single rotation shaft has at least one of said at least two ports configured to conduct said respective different filtrate from the at least one spacer towards the inside of said single rotation shaft.

5. The filtration device according to claim 3, wherein recovery of the different filtrate being carried out in the respective two separate parts of said single rotation shaft, each of the separate parts conducting the respective different filtrate in opposite directions towards said respective discharge devices, the two separate parts each being delimited by the respective discharge device for the respective different filtrate and by the position of the shutter.

6. The filtration device according to claim 1, wherein the at least one hollow rotation shaft comprises two hollow rotation shafts present inside said at least one enclosure, collection of the different filtrate being carried out in two separate parts within said at least one enclosure, each of the two separate parts evacuating the different filtrate in opposite directions towards said at least two separate discharge devices, and the two separate parts are each delimited by one of the two separate discharge devices for the different filtrate and a distal end of each of the two hollow rotation shafts inside the at least one enclosure.

7. The filtration device according to claim 1, wherein the at least one hollow rotation shaft includes at least two separate hollow rotation shafts disposed successively in the at least one enclosure and passing through said at least one enclosure, each of said at least two separate hollow rotation shafts being driven by at least one separate rotation device, said at least one separate rotation device of each of the at least two separate hollow rotation shafts being coaxial with respect to one another, said at least two separate rotation shafts being separated axially from each other, wherein at least one discharge device of the at least two separate discharge devices is provided per each one of the at least two separate hollow rotation shafts, each of the at least two separate discharge devices being disposed on said respective hollow rotation shaft outside said at least one enclosure.

8. The filtration device according to claim 7, wherein said at separate rotation device is disposed outside said at least one enclosure and at an end of each of said at least two separation hollow rotation shafts.

9. The filtration device according to claim 1, wherein said at least two separate discharge devices are disposed on said at least one hollow rotation shaft either between said at least one sealing plate and a proximal end of said at least one separate rotation device, or at a distal end of said at least one separate rotation device.

10. The filtration device according to claim 1, wherein a space between said at least one enclosure and at least one of the filtration discs is between 10 mm and 400 mm.

11. The filtration device according to claim 10, wherein a length of the inter-disc space varies between 4 mm and 10 mm and a seal is housed therein.

12. The filtration device according to claim 1, wherein the at least one hollow rotation shaft comprises at least two hollow rotation shafts, the device further comprises an introduction system configured to introduce the liquid to be filtered, the introduction system being connected to said at least one sealing plate, an outlet for the concentrate being connected at a point located between respective inner ends of the at least two hollow rotation shafts located in the at least one enclosure.

13. The filtration device according to claim 1, further comprising an introduction system configured to introduce the liquid to be filtered, the introduction system being connected to one of the at least one sealing plate, an outlet for the concentrate being connected to an opposite sealing plate that is opposite the one sealing plate.

14. The filtration device according to claim 1, wherein said plurality of filtration discs are divided into a plurality of groups, cut-off thresholds of the plurality of filtration discs being selected independently of each other to allow simultaneous obtainment of filtrates obtained with different cut-off thresholds.

15. A filtration method implemented by a device including
at least one enclosure defining a longitudinal axis, said at least one enclosure being obstructed at each end by at least one sealing plate,
a plurality of filtration discs that are each rotated,
at least one spacer disposed between each of two of the plurality of filtration discs, said at least one spacer defining an inter-disc space,
at least one hollow rotation shaft rotating said plurality of filtration discs, said at least one rotation shaft having at least two ports configured to collect different filtrate from the at least one spacer toward an interior of the at least one hollow rotation shaft, the at least one hollow rotation shaft passing through the at least one enclosure, said plurality of filtration discs and said at least one spacer being arranged on said at least one hollow rotation shaft inside said at least one enclosure, said at least one hollow rotation shaft being driven by at least one separate rotation device on at least one end of the plurality of ends of said at least one hollow rotation shaft, said at least one separate rotation device and said respective at least one hollow rotation shaft being coaxial,
at least two separate discharge devices configured to respectively discharge the different filtrate collected by a respective port of the at least two ports, said at least two separate discharge devices being disposed on said at least one hollow rotation shaft outside said at least one enclosure and upstream of said at least one separate rotation device, and
at least one introduction system configured to introduce liquid to be filtered,
said method comprising:
introducing the liquid to be filtered by the at least one introduction system;
rotating the at least one hollow rotation shaft by at least one rotation device separate from at least one of ends of said at least one hollow rotation shaft;
filtering said liquid to be filtered by passing the liquid through at least one of the filtration discs;
obtaining a concentrate inside the enclosure;
discharging said concentrate from said enclosure by at least one outlet for said concentrate;
obtaining the different filtrate collected by the at least two ports located on said at least one rotation shaft that are axial relative to said enclosure;
discharging the respective different filtrate by a first discharge device a second discharge device, said first and second discharge devices being disposed on said at least one rotation shaft outside said enclosure and upstream of said at least one rotation device.

16. The filtration method according to claim 15, further comprising:
wherein the at least one rotation shaft comprises at least two rotation shafts, and the rotating the at least one rotation shaft comprises rotating the at least two rotation shafts disposed successively in said enclosure and separated from each other, each of the at least two rotation shafts being driven by at least one separate rotation device, said rotation devices being coaxial,
filtering said liquid to be filtered (8) by passing it through at least one filtration disc (4).

* * * * *